3,013,998
DYEABLE COMPOSITIONS, ARTICLES FORMED THEREFROM AND METHODS FOR MAKING SAID ARTICLES
Bianco Battaglioli, Terni, Italy, assignor to Montecatini Societa Generale per l'Industria Mineraria e Chimica, Milan, Italy
No Drawing. Filed Sept. 16, 1957, Ser. No. 683,981
Claims priority, application Italy Sept. 27, 1956
12 Claims. (Cl. 260—23)

This invention relates to new polymeric compositions and more particularly to such new compositions comprising readily dyeable, at least prevailingly isotactic polypropylene, as well as to shaped articles, including fibers, formed from the compositions.

Recently G. Natta and his co-workers described new polymers of the alpha-olefines $CH_2=CHR$ in which R is a hydrocarbon radical. The polymers of the same alpha-olefine have very different steric structures and may be crystalline (crystallizable) or amorphous (non-crystallizable).

The crystallizable polymers are linear head-to-tail polymers consisting essentially of crystallizable macromolecules in which substantially all of the asymmetric tertiary main-chain carbon atoms of adjacent monomeric units have, on the same chain section, the same steric configuration and the main chain of the macromolecule, if fully extended in a plane, shows substantially all of the R groups bound to the tertiary carbon atoms of the monomeric units in said section on one side of the plane and all of the hydrogen atoms bound to said tertiary carbon atoms on the opposite side. Such crystallizable macromolecules were called "isotactic" macromolecules by Natta, and that term has since been adopted in the art.

The amorphous, non-crystallizable polymers are linear, head-to-tail polymers consisting essentially of non-crystallizable macromolecules in which tertiary asymmetric carbon atoms of the main chain having the same steric configuration have substantially a random distribution, and the main chain of the macromolecules, if fully extended in a plane, shows the R groups and the hydrogen atoms bound to the tertiary carbon atoms substantially in random distribution on the two sides of the plane. Such linear, regular head-to-tail non-crystallizable amorphous macromolecules were called "atactic" macromolecules by Natta.

Natta et al. have shown that the macromolecules of the two different steric structures exist together in the crude polymerizate obtained by polymerizing the alpha-olefine with the aid of a catalyst prepared from a compound, e.g., a halide, of a transition metal of the IV to VI groups of the periodic table and a metallorganic compound of a metal of the 1st to 3rd groups of the periodic table, e.g., an alkyl metal compound, and that the macromolecules can be separated by means of selective solvents on the basis of their different steric structures.

Natta et al. have shown, further, that by using specific catalysts of the general type aforementioned, it is possible to obtain directly polymerizates made up predominantly to substantially completely of isotactic macromolecules or predominantly to substantially completely of atactic macromolecules. Thus the polymerizate obtained by polymerizing the alpha-olefine with the aid of the catalyst prepared from a solid compound of the transition metal, e.g., titanium trichloride and, e.g., triethyl aluminum, and which is difficultly dispersible in the inert hydrocarbon used as polymerizing medium, consists predominantly to substantialy completely of isotactic macromolecules.

The new isotactic or prevailingly isotactic poly (alpha-olefines) and particularly polypropylene are characterized by exceptional mechanical strength, low density, and high elastic properties by reason of which the polymers are adapted to use for many important industrial applications. However, because of their chemical and structural characteristics, coherent solid bodies formed from the new alpha-olefine polymers, particularly those polymers which are highly crystalline, have little affinity for pigments and dyes. Being resistant to penetration by water and organic solvents which are swelling agents for various other thermoplastic materials and synthetic resins, the poly (alpha-olefines) cannot be dyed satisfactorily by the methods which have been applied, successfully to, e.g., cellulose acetate, "Orlon" etc., and according to which fibers or other shaped articles or masses are dyed in a dyebath comprising the dye and a swelling agent for the cellulose ester or synthetic resin which, by swelling the fibers or other article, permits the dye to be carried into the structure.

This non-receptivity of the poly (alpha-olefines) for dyestuffs hampers the use of the polymers in certain fields, particularly the textile field.

One method which has been disclosed for overcoming the non-receptivity of the polymers for dyestuffs comprises grafting polymeric chains containing functional groups that absorb swelling agents or have an affinity for dyestuffs onto the surface of the shaped articles formed from the poly (alpha-olefines).

The object of this invention is to provide a new and simpler method for improving the dye-receptivity of the poly (alpha-olefines) and articles formed therefrom.

Another object is to provide a method for improving the dyeing capacity of the poly (alpha-olefines) and articles formed therefrom which does not require treatment of the articles for grafting modifying groups onto the surface thereof.

These and other objects are accomplished by incorporating in the poly (alpha-olefine), and more particularly in highly crystalline (isotactic) polypropylene, prior to forming the same into shaped articles, from 1 to 20%, preferably from 5 to 15% by weight of an uncured epoxy resin, based on the polypropylene weight. The blends of the poly (alpha-olefine) and epoxy resin are receptive to both acid dyes and the so-called acetate dyes.

The epoxy resins used in practicing this invention are condensation products of epihalohydrins, particularly epichlorhydrin with bis-phenols, usually 4,4'-dihydroxydiphenyldimethylmethane, with alkali metal sulphides such as sodium sulphide, or with amines such as aniline, and preferably have softening points in the range 90° C. to 170° C.

Derivatives of the epoxy resins may also be used. These include the esters of the condensates with aliphatic acids, especially oleic, linoleic, linolenic, and other unsaturated fatty oil acids including styrenated unsaturated fatty oil acids.

The new polymeric compositions of the invention can be prepared by intimately mixing powdered or melted polypropylene and uncured epoxy resin under conditions to form a homogeneous blend, which can be melt-extruded to obtain articles of various shapes, including filaments, the articles thus obtained being preferably stretched for molecular orientation. The blend may be extruded through a single-orifice spinneret to form monofilaments, or through a spinneret provided with a multiplicity of orifices to form a plurality of filaments which may be twisted together to obtain a multi-filament yarn or retained as separate filaments and used as monofilament yarns. A multiplicity of filaments may be gathered into a bundle or tow and cut or otherwise disrupted to staple fibers which, alone or in admixture with other fibers, may be formed into a spun yarn.

The shaped articles formed from the blend are advantageously treated with a curing agent for the epoxy resin, prior to being dyed. Known curing agents for those resins include thermosetting resins with methylol groups present, fatty acids or acid anhydrides, amines and other nitrogen compounds. For the present purposes, amines, e.g., triethylamine, ethylene diamine, diethylene triamine and hexamethylenediamine, are the preferred curing agents. The treatment of the shaped article comprising the mixture of polypropylene and epoxy resin with the curing agent facilitates the absorption of the acid and acetate type dyes thereby and improves the fastness of the dye, at the same time improving the solvent resistance and dimensional stability of the shaped article.

The shaped articles formed from the mixture retain, practically unchanged, all of the mechanical characteristics of the polypropylene but have modified and improved surface characteristics including a white appearance, in addition to affinity for various types of dyestuffs, more particularly the acid and acetate dyes.

After the curing treatment, the filaments and fibers may be dyed before or after spinning into a yarn, and the yarns (if made from the undyed filaments or fibers) may be dyed before or after being knitted, woven, netted, braided, or otherwise fabricated.

The following examples, in which all parts are by weight unless otherwise specified, are given to illustrate the invention, and are not to be regarded as limitative.

*Example 1*

Ninety parts of crystalline polypropylene (intrinsic viscosity in tetrahydronaphthalene at 135° C.=1.08) were mixed with 10 parts of an epoxy resin obtained by condensing $(n+2)$ mols of epichlorhydrin and $(n+1)$ mols of the diphenol, 4,4'-dihydroxy-diphenyl-dimethylmethane under the usual epoxy resin-forming conditions. The epoxy resin has a specific gravity of 1.19 and contains 4.3% epoxy oxygen.

The mixing was performed in a Werner mixer, at room temperature, for one hour. The blend was melted at 250° C. and extruded through a spinneret having 18 orifices each of 0.4 mm. diameter. The filaments obtained were oriented by stretching on a heated plate with a stretch ratio of 1:4.5.

The serimetrical characteristics of the stretched and oriented filaments are as follows—

Tenacity _____g./den__ 3.76
Elongation _____percent__ 46
Shrinkage in water at 100° C. _____do____ 3

The yarns were dyed with dispersed acetate dyes; the dyeability was generally good and the color fastness satisfactory.

The water absorption of the dyed yarns was determined by keeping samples of the yarns for 70 hours in room conditioned to 50%, 80% and 100% relative humidity, and compared to the water absorptivity of yarns consisting of the polypropylene, with the following results—

| Percent Relative Humidity | Percent Water Absorption | |
|---|---|---|
| | Yarn of Ex. 1 | Yarns of Polypropylene |
| 50 | 1.1 | 1.75 |
| 80 | 3.1 | 2.9 |
| 100 | 7.2 | 3.3 |

*Example 2*

Undyed yarns produced in accordance with Example 1 were treated with a 20% aqueous solution of hexamethylenediamine at 100° C. for 1 hour, to cure the epoxy resin, and then rinsed with water. The mechanical properties of these yarns were as follows—

Tenacity _____g./den__ 3.33
Elongation _____percent__ 46
Shrinkage in water at 100° C. _____do____ 0

The yarns were dyed as in Example 1. The receptivity for the dyes was good, and the color fastness was even better than the color fastness of the yarns of Example 1 and comprising the epoxy resin in the uncured condition. The water absorption capacity of the yarns of Example 2 was determined as in Example 1, the results being given below.

| Percent Relative Humidity | Percent water Absorption |
|---|---|
| 50 | 5.3 |
| 80 | 5.8 |
| 100 | 6.2 |

*Example 3*

The procedure of Example 1 was repeated, using a blend of 95 parts polypropylene (intrinsic viscosity=0.97) and 5 parts uncured epoxy resin obtained by condensing 2 mols of epichlorhydrin with 1 mol sodium sulfide. The melted blend was extruded in the form of a film, using the apparatus conventionally used in forming extruded films of thermoplastic materials. The film had good receptivity for the acetate dyes.

*Example 4*

Ninety parts of polypropylene (intrinsic viscosity= 1.19) and 10 parts of an oleate obtained by esterifying the uncured epoxy resin of Example 1 with oleic acid were intimately blended together. The blend was melted at 220° C. and extruded through a spinneret having 18 holes of 0.4 mm. diameter. The filaments thus obtained were oriented by stretching with a ratio of 1:4.5. The stretched, oriented filaments had the following characteristics:

Tenacity _____g./den__ 3.51
Elongation _____percent__ 19
Shrinkage in water at 100° C_____do____ 0

The receptivity for the acetate dyes was good, and the colors were generally fast. The water absorption, in atmospheres adjusted to 50%, 80% and 100% relative humidity, was found to be, respectively, 0.7%; 1.7% and 14%.

*Example 5*

Ninety parts of polypropylene (intrinsic viscosity= 1.19) and 10 parts of a resin obtained by esterifying the uncured epoxy resin of Example 1 with linoleic acid and then reacting the ester with styrene, were blended together, melted and extruded as in Example 1. The stretched, oriented filaments had the following properties:

Tenacity _____g./den__ 3.37
Elongation _____percent___ 22.8
Shrinkage in water at 100° C_____do____ 8.3

The filaments are dyed satisfactorily with the acetate dyes, and the colors have generally good fastness. The water absorption, in rooms adjusted to 50%, 80% and 100% relative humidity, is respectively, 1.03%, 3.1% and 4.6%.

*Example 6*

Ninety parts of polypropylene (intrinsic viscosity= 1.24) were mixed with 10 parts of an epoxy resin obtained by condensing epichlorhydrin with hydroquinone. The mix was melted at 190° C. and extruded through a spinneret having 18 holes of 0.4 mm. diameter. The filaments were stretch-oriented with a stretching ratio of 1:4.5, and after the stretching had properties as follows:

Tenacity _____ g./den__ 4.08
Elongation _____ percent__ 21
Shrinkage in water at 100° C_____ do____ 8.5

The filaments are easily dyed to fast, good shades with acetate dyes as in Example 1. The water absorption, in atmospheres adjusted to 50%, 80% and 100% relative humidity is, respectively, 1.12%; 1.98% and 18%.

*Example 7*

Ninety-five parts of polypropylene (intrinsic viscosity= 1.17) were blended with 5 parts of an epoxy resin obtained by condensing epichlorhydrin with aniline. The blend was melted at 200° C. and extruded through a spinneret having 18 holes of 0.4 mm. diameter. After stretching with a ratio of 1:4.5, the filaments have the following characteristics:

Tenacity _____ g./den__ 2.94
Elongation _____ percent__ 23.3
Shrinkage in water at 100° C_____ do____ 7

The receptivity for acetate and acid dyes is good, and the color fastness is satisfactory. The water absorption, in atmospheres adjusted to 50%, 80% and 100% relative humidity, is, respectively, 1.06%; 2.17% and 17.9%.

The polypropylene used in practicing the invention is at least prevailingly isotactic (crystalline) the content of atactic (non-crystallizable) polymer contained therein being not in excess of about 15%.

Instead of the filaments and yarns, or film shown in the examples, other dyeable articles of various sizes and shapes may be molded from the blend of the isotactic polypropylene and uncured epoxy resin. As is apparent from the examples, the dye-acceptance of the blend is considerably improved, as compared to the dye-acceptance of isotactic polypropylene alone, whether the articles formed from the blend are treated with a curing agent for the epoxy resin or not.

In addition to the epoxy resins obtained by condensation of the epihalohydrin with 4,4'-dihydroxydiphenyl-dimethylmethane or hydroquinone, shown in the examples, there may also be used the epoxy resins resulting from the condensation of the epihalohydrin with other mono- or poly-nuclear polyhydric phenols such as resorcinol, catechol, phloroglucinol; p,p'-dihydroxyphenone; p,p'-dihydroxydiphenyl; p,p'-dihydroxydibenzyl; o,p,o',p'-tetrahydroxydiphenyl dimethyl methane; hematoxylin, polyhydric anthracenes, polyhydric naphthalenes, etc., and in general, the entire class of epoxy resins and their derivatives, particularly the unsaturated fatty acid esters, which derivatives, for the present purpose, are included in the term "epoxy resin" as used herein.

Various changes and modifications may be made in the details exemplified, in practicing the invention. Therefore, it is intended to include in the scope of the appended claims, all such modifications as may be apparent to those skilled in the art.

What is claimed is:

1. As a new composition of matter, a dyeable blend of polypropylene consisting for at least 85% of isotactic macromolecules with from 1% to 20% by weight based on the polypropylene weight, of an uncured epoxy resin selected from the group consisting of (a) condensates of an epihalohydrin and a substance selected from the group consisting of bis-phenol, hydroquinone, sodium sulfide and aniline, (b) aliphatic acid esters of condensates of epihalohydrin with bis-phenol, and (c) styrenated unsaturated fatty oil acid esters of condensates of an epihalohydrin with bis-phenol.

2. A new composition of matter according to claim 1 and characterized in that the uncured epoxy resin is present in the blend in an amount of from 5% to 15% by weight based on the polypropylene weight.

3. As a new composition of matter, a dyeable blend of polypropylene consisting for at least 85% of isotactic macromolecules with from 1% to 20% by weight based on the polypropylene weight, of an uncured epoxy resin obtained by condensing epichlorhydrin with 4,4'-dihydroxydiphenyl-dimethylmethane.

4. As a new composition of matter, a dyeable blend of polypropylene consisting for at least 85% of isotactic macromolecules with from 1% to 20% by weight based on the polypropylene weight, of an uncured epoxy resin obtained by condensing epichlorhydrin with hydroquinone.

5. As a new composition of matter, a dyeable blend of polypropylene consisting for at least 85% of isotactic macromolecules with from 1% to 20% by weight based on the polypropylene weight, of an uncured epoxy resin obtained by condensing epichlorhydrin with sodium sulfide.

6. As a new composition of matter, a dyeable blend of polypropylene consisting for at least 85% of isotactic macromolecules with from 1% to 20% by weight based on the polypropylene weight, of an uncured epoxy resin comprising an aliphatic acid ester of a condensation product of an epihalohydrin with bis-phenol.

7. As a new composition of matter, a dyeable blend of polypropylene consisting for at least 85% of isotactic macromolecules with from 1% to 20% by weight based on the polypropylene weight, of an uncured epoxy resin comprising a styrenated unsaturated fatty oil acid ester of a condensation product of an epihalohydrin with bis-phenol.

8. As a new composition of matter, a dyeable blend of polypropylene consisting for at least 85% of isotactic macromolecules with from 1% to 20% by weight based on the polypropylene weight, of an uncured epoxy resin obtained by condensing an epihalohydrin with aniline.

9. As new articles of manufacture, dyeable fibers, filaments and yarns comprising a blend of polypropylene consisting for macromolecules consisting for at least 85% of isotactic polymer, with from 1% to 20% by weight based on the polypropylene weight of an uncured epoxy resin selected from the group consisting of (a) condensates of an epihalohydrin with a substance selected from the group consisting of bis-phenol, hydroquinone, sodium sulfide and aniline, (b) aliphatic acid esters of condensates of an epihalohydrin with bis-phenol, and (c) styrenated unsaturated fatty oil acid esters of condensates of an epihalohydrin with bis-phenol.

10. As new articles of manufacture, dyeable fibers, filaments and yarns comprising a blend of polypropylene consisting for macromolecules consisting for at least 85% of isotactic polymer, with from 1% to 20% by weight based on the polypropylene weight of a cured epoxy resin selected from the group consisting of (a) condensates of an epihalohydrin with a substance selected from the group consisting of bis-phenol, hydroquinone, sodium sulfide and aniline, (b) aliphatic acid esters of condensates of an epihalohydrin with bis-phenol, and (c) styrenated unsaturated fatty oil acid esters of condensates of an epihalohydrin with bis-phenol.

11. As new products of manufacture, dyeable shaped articles comprising a blend of macromolecules consisting for at least 85% of isotactic polymer with an uncured epoxy resin selected from the group consisting of (a) condensates of an epihalohydrin with a substance selected from the group consisting of bis-phenol, hydroquinone, sodium sulfide and aniline, (b) aliphatic acid esters of condensates of an epihalohydrin with bis-phenol, and (c) styrenated unsaturated fatty oil acid esters of condensates of an epihalohydrin with bis-phenol.

12. As new products of manufacture, dyeable shaped articles comprising a blend of macromolecules consisting for at least 85% of isotactic polymer with a cured epoxy resin selected from the group consisting of (a) condensates of an epihalohydrin with a substance selected from the group consisting of bis-phenol, hydroquinone, sodium sulfide and aniline, (b) aliphatic acid esters of condensates of an epihalohydrin with bis-phenol, and (c) styrenated unsaturated fatty oil acid esters of condensates of an epihalohydrin with bis-phenol.

References Cited in the file of this patent

UNITED STATES PATENTS

| | | |
|---|---|---|
| 2,131,145 | Schlack | Sept. 27, 1938 |
| 2,367,173 | Martin | Jan. 9, 1945 |
| 2,376,511 | Saunders | May 22, 1945 |
| 2,512,996 | Bixler | June 27, 1950 |
| 2,683,130 | D'Alelio | July 6, 1954 |
| 2,707,709 | Buchdahl | May 3, 1955 |
| 2,713,567 | Scheibli | July 19, 1955 |

FOREIGN PATENTS

| | | |
|---|---|---|
| 470,662 | Canada | Jan. 9, 1951 |
| 504,172 | Italy | Dec. 10, 1954 |

OTHER REFERENCES

Charlton, "Modern Plastics," September 1954, pp. 155–57, 160, 161, 240–43.

Natta, "La Chimica el' Industria," November 1955, 37th year, No. 12, pp. 927 and 929.